US012754430B2

(12) United States Patent
Amirsolaimani

(10) Patent No.: US 12,754,430 B2
(45) Date of Patent: *Oct. 6, 2026

(54) FIELD OF VIEW EXPANSION BY IMAGE LIGHT REDIRECTION

(71) Applicant: Meta Platforms Technologies, LLC, Menlo Park, CA (US)

(72) Inventor: Babak Amirsolaimani, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/797,414

(22) Filed: Aug. 7, 2024

(65) Prior Publication Data

US 2024/0393600 A1 Nov. 28, 2024

Related U.S. Application Data

(63) Continuation of application No. 18/110,856, filed on Feb. 16, 2023, now Pat. No. 12,061,343.

(Continued)

(51) Int. Cl.

*G02B 27/01* (2006.01)
*G02B 27/09* (2006.01)

(Continued)

(52) U.S. Cl.

CPC ..... *G02B 27/0172* (2013.01); *G02B 27/0977* (2013.01); *G02B 27/286* (2013.01); *G02B 27/44* (2013.01); *G02B 2027/0123* (2013.01)

(58) Field of Classification Search

CPC .............. G02B 27/017; G02B 27/0172; G02B 27/0977; G02B 27/286; G02B 27/44; G02B 2027/0123; G02B 2027/0125

See application file for complete search history.

(56) References Cited

U.S. PATENT DOCUMENTS 6,400,885 B1 6/2002 Hu et al.
7,884,977 B2 2/2011 Mori (Continued)

FOREIGN PATENT DOCUMENTS

CN 210323583 U 4/2020
CN 113075793 A 7/2021

(Continued)

OTHER PUBLICATIONS

Aalizadeh M., et al., "Toward Electrically Tunable, Lithography-Free, Ultra-Thin Color Filters Covering the Whole Visible Spectrum," Scinetific Reports, vol. 8, No. 1, Jul. 27, 2018, 11 pages.

(Continued)

*Primary Examiner* — Mihir K Rayan
(74) *Attorney, Agent, or Firm* — Greenberg Traurig, LLP

(57) ABSTRACT

A near-eye display has an image projector coupled to a lightguide for receiving and propagating image light provided by the image projector, the image light carrying an image to be displayed to a viewer. Field of view of the near-eye display may be expanded by providing a beam redirector downstream of the lightguide for controllably redirecting the image light m coordination with displaying different field of view portions by the image projector. To compensate the redirection of external light by the beam redirector, a second beam redirector may be provided upstream of the first redirector and the lightguide.

20 Claims, 8 Drawing Sheets

Related U.S. Application Data

(60) Provisional application No. 63/392,425, filed on Jul. 26, 2022, provisional application No. 63/341,416, filed on May 12, 2022.

(51) Int. Cl.
*G02B 27/28* (2006.01)
*G02B 27/44* (2006.01)

(56) References Cited

U.S. PATENT DOCUMENTS 8,086,044 B2 12/2011 Feng et al.
8,817,350 B1 8/2014 Robbins et al.
8,878,773 B1 11/2014 Bozarth
9,230,515 B2 1/2016 Liu
9,274,597 B1 3/2016 Karakotsios et al.
9,557,568 B1 1/2017 Ouderkirk et al.
9,664,824 B2 5/2017 Simmonds et al.
10,108,014 B2 10/2018 Vallius et al.
10,217,286 B1 2/2019 Angel et al.
10,295,723 B1 5/2019 Lee et al.
10,466,484 B1 11/2019 Yoon et al.
10,466,779 B1 11/2019 Liu
10,502,963 B1 12/2019 Noble et al.
10,527,855 B2 1/2020 Alexander et al.
10,571,699 B1 2/2020 Parsons et al.
10,678,116 B1 6/2020 Lam et al.
10,712,576 B1 7/2020 McEldowney
10,775,633 B1 9/2020 Lee et al.
10,782,526 B2 9/2020 Van Heugten
10,838,132 B1 11/2020 Calafiore et al.
10,885,843 B1 1/2021 Lu et al.
10,890,823 B1 1/2021 Jiang et al.
11,009,737 B1 5/2021 Matsuda et al.
11,120,728 B2 9/2021 Nagasaki et al.
11,176,367 B1 11/2021 Fix et al.
11,393,430 B2 7/2022 Nagasaki et al.
11,397,465 B1 7/2022 Mattila et al.
11,428,938 B2 8/2022 Yaroshchuk et al.
12,061,343 B2 * 8/2024 Amirsolaimani .. G02B 27/0977
2004/0227838 A1 11/2004 Atarashi et al.
2006/0146012 A1 7/2006 Arneson et al.
2007/0103381 A1 5/2007 Upton
2007/0188837 A1 8/2007 Shimizu et al.
2008/0143820 A1 6/2008 Peterson
2008/0212161 A1 9/2008 Valette et al.
2008/0212942 A1 9/2008 Gordon et al.
2008/0309649 A1 12/2008 Kojima et al.
2009/0040580 A1 2/2009 Mukawa
2009/0196460 A1 8/2009 Jakobs et al.
2011/0234750 A1 9/2011 Lai et al.
2012/0188467 A1 * 7/2012 Escuti .................. G02F 1/1347 349/1
2012/0218481 A1 8/2012 Popovich et al.
2012/0249957 A1 10/2012 Shibata et al.
2012/0250980 A1 10/2012 Gillard et al.
2012/0254369 A1 10/2012 Gillard et al.
2012/0257005 A1 10/2012 Browne
2013/0050807 A1 2/2013 Lee et al.
2013/0099700 A1 4/2013 Kreye et al.
2013/0182066 A1 7/2013 Ishimoto
2013/0201547 A1 8/2013 Cho et al.
2014/0037213 A1 2/2014 Niederberger et al.
2014/0049452 A1 2/2014 Maltz
2014/0098010 A1 4/2014 Travis
2014/0176528 A1 6/2014 Robbins
2014/0232651 A1 8/2014 Kress et al.
2014/0300966 A1 10/2014 Travers et al.
2015/0160529 A1 6/2015 Popovich et al.
2015/0235460 A1 8/2015 Schowengerdt et al.
2015/0243718 A1 8/2015 Kwon et al.
2015/0253591 A1 9/2015 Kato et al.
2015/0323790 A1 11/2015 Dominici et al.
2016/0029883 A1 2/2016 Cox
2016/0085300 A1 3/2016 Robbins et al.
2016/0124212 A1 5/2016 Choi et al.
2016/0241892 A1 8/2016 Cole et al.
2016/0342205 A1 11/2016 Shigeta et al.
2017/0010466 A1 1/2017 Klug et al.
2017/0307886 A1 10/2017 Stenberg et al.
2018/0045960 A1 2/2018 Palacios et al.
2018/0046859 A1 2/2018 Jarvenpaa
2018/0073686 A1 3/2018 Quilici et al.
2018/0081322 A1 3/2018 Robbins et al.
2018/0143586 A1 5/2018 Narducci et al.
2018/0196263 A1 7/2018 Vallius et al.
2018/0232048 A1 8/2018 Popovich et al.
2018/0237696 A1 8/2018 Tuffin et al.
2018/0239177 A1 8/2018 Oh
2018/0275409 A1 9/2018 Gao et al.
2018/0307048 A1 10/2018 Alexander et al.
2018/0364487 A1 12/2018 Yeoh et al.
2019/0041634 A1 2/2019 Popovich et al.
2019/0075281 A1 * 3/2019 Hall ...................... G01S 7/4814
2019/0079292 A1 3/2019 Alexander et al.
2019/0086674 A1 3/2019 Sinay et al.
2019/0094536 A1 3/2019 TeKolste et al.
2019/0094981 A1 3/2019 Bradski et al.
2019/0101757 A1 * 4/2019 Martinez ................. G06F 3/013
2019/0147564 A1 5/2019 Yuan et al.
2019/0243134 A1 8/2019 Perreault et al.
2019/0243209 A1 8/2019 Perreault et al.
2019/0310456 A1 10/2019 Meng et al.
2019/0317450 A1 10/2019 Yaroshchuk et al.
2019/0353906 A1 * 11/2019 Gollier ................. G02B 27/144
2019/0361241 A1 11/2019 Amitai
2020/0041787 A1 2/2020 Popovich et al.
2020/0043398 A1 2/2020 Salazar
2020/0049996 A1 2/2020 Yan et al.
2020/0064633 A1 2/2020 Maimone
2020/0081252 A1 3/2020 Jamali et al.
2020/0116995 A1 4/2020 Chi et al.
2020/0116996 A1 4/2020 Lee et al.
2020/0143741 A1 5/2020 Tsuboi et al.
2020/0159084 A1 5/2020 Choi
2020/0166754 A1 5/2020 Leister et al.
2020/0174284 A1 6/2020 Chan et al.
2020/0183159 A1 6/2020 Danziger
2020/0183174 A1 6/2020 Noui et al.
2020/0271936 A1 8/2020 Leibovici et al.
2020/0336645 A1 10/2020 Fukuda
2020/0368616 A1 11/2020 Delamont
2020/0371388 A1 11/2020 Geng et al.
2020/0412965 A1 12/2020 Yoshida
2021/0011284 A1 1/2021 Andreev et al.
2021/0041948 A1 2/2021 Berkner-Cieslicki et al.
2021/0055555 A1 2/2021 Chi et al.
2021/0191122 A1 6/2021 Yaroshchuk et al.
2021/0199958 A1 7/2021 Huang et al.
2021/0199970 A1 7/2021 Huang et al.
2021/0208389 A1 7/2021 Lu et al.
2021/0208397 A1 7/2021 Lu et al.
2021/0209364 A1 7/2021 Park et al.
2021/0215856 A1 7/2021 Yu et al.
2021/0223549 A1 7/2021 Maimone et al.
2021/0286178 A1 9/2021 Gollier et al.
2021/0333402 A1 10/2021 Ronchini Ximenes et al.
2021/0405374 A1 12/2021 Komanduri et al.
2021/0405380 A1 12/2021 Urness et al.
2022/0004001 A1 1/2022 Danziger et al.
2022/0197376 A1 6/2022 Boyle et al.
2022/0299754 A1 9/2022 Gollier et al.
2022/0350219 A1 11/2022 Danziger
2022/0382061 A1 12/2022 Schultz
2022/0382064 A1 12/2022 Rohn et al.
2022/0390744 A1 12/2022 Alasaarela
2022/0390749 A1 * 12/2022 Yun ....................... G02B 5/188
2022/0394234 A1 12/2022 Etigson et al.
2022/0397956 A1 12/2022 Lundell et al.
2022/0413302 A1 12/2022 Meitav et al.
2022/0413603 A1 12/2022 Held et al.
2023/0014577 A1 1/2023 Gollier et al.
2023/0057514 A1 2/2023 Fix et al.

(56) References Cited

U.S. PATENT DOCUMENTS

FOREIGN PATENT DOCUMENTS

| | | | |
|---|---|---|---|
| CN | 113728258 | A | 11/2021 |
| CN | 114026485 | A | 2/2022 |
| CN | 115698819 | A | 2/2023 |
| EP | 2767852 | A1 | 8/2014 |
| EP | 3309602 | A1 | 4/2018 |
| GB | 422680 | A | 1/1935 |
| GB | 2422680 | A | 8/2006 |
| GB | 2585211 | A | 1/2021 |
| JP | H0682851 | A | 3/1994 |
| KR | 20170094350 | A | 8/2017 |
| KR | 20180135646 | A | 12/2018 |
| KR | 20210004776 | A | 1/2021 |
| TW | 200630641 | A | 9/2006 |
| TW | 202142930 | A | 11/2021 |
| WO | 2013033274 | A1 | 3/2013 |
| WO | 2017189268 | A1 | 11/2017 |
| WO | 2018039277 | A1 | 3/2018 |
| WO | 2019178398 | A1 | 9/2019 |
| WO | 2021030093 | A1 | 2/2021 |
| WO | 2021091622 | A1 | 5/2021 |
| WO | 2021242667 | A1 | 12/2021 |
| WO | 2022052949 | A1 | 3/2022 |

OTHER PUBLICATIONS

Chang A. S. P., "Tunable Liquid Crystal-Resonant Grating Filter Fabricated by Nanoimprint Lithography," IEEE Photonics Technology Letters, vol. 19, No. 19, Oct. 1, 2007, pp. 1457-1459.
Draper C.T., et al., Holographic Waveguide Head-Up Display with 2-D Pupil Expansion and Longitudinal Image Magnification, Applied Optics, Feb. 10, 2019, vol. 58, No. 5, pp. A251-A257.
International Preliminary Report on Patentability for International Application No. PCT/US2022/051388, mailed Jun. 20, 2024, 10 pages.
International Preliminary Report on Patentability for International Application No. PCT/US2022/051487, mailed Jun. 20, 2024, 7 pages.
International Preliminary Report on Patentability for International Application No. PCT/US2022/051608, mailed Jun. 20, 2024, 9 pages.
International Preliminary Report on Patentability for International Application No. PCT/US2022/051751, mailed Jun. 20, 2024, 12 pages.
International Preliminary Report on Patentability for International Application No. PCT/US2022/051755, mailed Jun. 20, 2024, 7 pages.
International Preliminary Report on Patentability for International Application No. PCT/US2022/051758, mailed Jun. 20, 2024, 7 pages.
International Preliminary Report on Patentability for International Application No. PCT/US2022/051781, mailed Jun. 20, 2024, 11 pages.
International Preliminary Report on Patentability for International Application No. PCT/US2022/051801, mailed Jun. 20, 2024, 10 pages.
International Preliminary Report on Patentability for International Application No. PCT/US2022/051805, mailed Jun. 20, 2024, 9 pages.
International Preliminary Report on Patentability for International Application No. PCT/US2022/051809, mailed Jun. 20, 2024, 9 pages.
International Preliminary Report on Patentability for International Application No. PCT/US2022/051814, mailed Jun. 20, 2024, 16 pages.
International Preliminary Report on Patentability for International Application No. PCT/US2023/021899, mailed Nov. 21, 2024, 9 pages.
International Preliminary Report on Patentability for International Application No. PCT/US2023/021926, mailed Nov. 21, 2024, 10 pages.
International Preliminary Report on Patentability for International Application No. PCT/US2023/022012, mailed Nov. 21, 2024, 9 pages.
International Search Report and Written Opinion for International Application No. PCT/US2022/051388, mailed Apr. 6, 2023, 12 pages.
International Search Report and Written Opinion for International Application No. PCT/US2022/051487, mailed Apr. 11, 2023, 8 pages.
International Search Report and Written Opinion for International Application No. PCT/US2022/051608, mailed Apr. 5, 2023, 11 pages.
International Search Report and Written Opinion for International Application No. PCT/US2022/051751, mailed Apr. 11, 2023, 14 pages.
International Search Report and Written Opinion for international Application No. PCT/US2022/051755, mailed Apr. 26, 2023, 9 pages.
International Search Report and Written Opinion for International Application No. PCT/US2022/051758, mailed Mar. 22, 2023, 9 pages.
International Search Report and Written Opinion for International Application No. PCT/US2022/051781, mailed Apr. 18, 2023, 13 pages.
International Search Report and Written Opinion for International Application No. PCT/US2022/051801 mailed Apr. 14, 2023, 11 pages.
International Search Report and Written Opinion for International Application No. PCT/US2022/051805 mailed Apr. 14, 2023, 10 pages.
International Search Report and Written Opinion for International Application No. PCT/US2022/051809, mailed Apr. 5, 2023, 10 pages.
International Search Report and Written Opinion for International Application No. PCT/US2022/051814, mailed Jun. 2, 2023, 20 pages.
International Search Report and Written Opinion for International Application No. PCT/US2023/021926, mailed Sep. 4, 2023, 12 pages.
International Search Report and Written Opinion for International Application No. PCT/US2023/022012, mailed 01September 2023, 11 pages.
Invitation to Pay Additional Fees for International Application No. PCT/US2022/051814, mailed Apr. 11, 2023, 14 pages.
Jolly S., et al., "Near-to-Eye Electroholography via Guided-Wave Acousto-Optics for Augmented Reality," Proceedings of SPIE, vol. 10127, Mar. 2, 2017, 11 pages.
Kollosche M., et al., "Voltage-Controlled Compression for Period Tuning of Optical Surface Relief Gratings," Optics Letters, vol. 36, No. 8, Apr. 15, 2011, pp. 1389-1391.
Lee K. M., et al., "Color-Tunable Mirrors Based on Electrically Regulated Bandwidth Broadening in Polymer-Stabilized Cholesteric Liquid Crystals," ACS Photonics, Sep. 17, 2014, pp. 1033-1041.
Lin I-T., et al., "Electro-Responsive Surfaces with Controllable Wrinkling Patterns for Switchable Light reflection—Diffusion-Grating Devices," Marterials Today, vol. 41, Dec. 2020, 11 pages.
Maimone A., et al, "Holographic Optics for Thin and Lightweight Virtual Reality," Facebook Reality Labs, ACM Trans. Graph. Article 67, vol. 39, No. 4, Jul. 2020, 14 pages.
Palto S.P., "Dynamic and Photonic Properties of Field-Induced Gratings in Flexoelectric LC Layers," Crystals, 2021, vol. 11, 894, 13 pages.
Pogue R.T., et al., Electrically Switchable Bragg Gratings from Liquid Crystal/Polymer Composites, Applied Spectroscopy, 2000, vol. 54, No. 1, pp. 12A-28A.
Shih W-C., et al, "High-Resolution Electrostatic Analog Tunable Grating With a Single-Mask Fabrication Process," Journal of Microelectromechanical Systems, vol. 15, No. 4, Aug. 2006, pp. 763-769.

(56) References Cited

OTHER PUBLICATIONS

Sirleto L., et al., "Electro-Optical Switch and Continuously Tunable Filter based on a Bragg Grating in a Planar Waveguide with a Liquid Crystal Overlayer," Optical Engineering, vol. 41, No. 11, Nov. 2002, pp. 2890-2898.
Smalley D.E., et al., Status of Leaky Mode of Holography, Photonics, 2021, 8, 292,22 pages.
Xiang J., et al., "Electrically Tunable Selective Reflection of Light from Ultraviolet to Visible and Infrared by Heliconical Cholesterics," Advanced Materials, vol. 27, Issue19, May 20, 2015, 5 pages.
Xiang J., et al., "Electrooptic Response of Chiral Nematic Liquid Crystals with Oblique Helicoidal Director," Physical Review Letters, 2014, 112, 217801, 14 pages.
Zhan T., et al., "High-Efficiency Switchable Optical Elements for Advanced Head-Up Displays," Journal of the Society for Information Display, Mar. 21, 2019, vol. 27, No. 4, pp. 223-231.
Office Action mailed Mar. 12, 2025 for European Patent Application No. 22847298.1, filed on Dec. 4, 2022, 5 pages.
Office Action for Taiwan Application No. 111141407, mailed on Jul. 1, 2026 , 14 pages.
Office Action for Taiwan Application No. 111135867, mailed on Jul. 13, 2026, 11 pages.
Office Action mailed Feb. 4, 2026 for European Patent Application No. 22843941.0, filed on Dec. 3, 2022, 9 pages.
Office Action mailed May 6, 2026 for European Patent Application No. 23729602.5, filed on May 11, 2023, 8 pages.
Office Action mailed May 18, 2026 for European Patent Application No. 23730272.4, filed on May 12, 2023, 10 pages.
Office Action mailed May 27, 2026 for European Patent Application No. 23731784.7, filed on May 11, 2023, 9 pages.
Richter P., et al., "Compact AR-HUD Solution with optical waveguide," ATZelektronik worldwide, Mar. 2017, pp. 18-23.

* cited by examiner

FIELD OF VIEW EXPANSION BY IMAGE LIGHT REDIRECTION

REFERENCE TO RELATED APPLICATION

This application is a continuation of U.S. application Ser. No. 18/110,856 filed on Feb. 16, 2023 which claims priority from U.S. Provisional Patent Application No. 63/341,416 entitled "Active Eyebox Solutions and Applications" filed on May 12, 2022, and U.S. Provisional Patent Application No. 63/392,425 entitled "Field of View Expansion by Image Light Redirection" filed on Jul. 26, 2022, each of which is incorporated herein by reference in its entirety.

TECHNICAL FIELD

The present disclosure relates to visual display devices and related components, modules, and methods.

BACKGROUND

Visual displays provide information to viewer(s) including still images, video, data, etc. Visual displays have applications in diverse fields including entertainment, education, engineering, science, professional training, advertising, to name just a few examples. Some visual displays, such as TV sets, display images to several users at a time, and some visual display systems, such s near-eye displays (NEDs), are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGis)) superimposed with the surrounding environment by seeing through a "combiner" component. The combiner of a wearable display is typically transparent to external light
but includes some light routing optics to direct the display light into the user's field of view.

Human sight has a rather wide overall field of view (FOV). For an AR/VR system to mimic human sight, the operational field of view needs to approach that of human vision. A straightforward approach to achieve the full vision FOV would require wide numerical aperture optics and large pixel counts, increasing size, weight, complicates the processing electronics, and increases power demands of a display. Because a display of HMD or NED is usually worn on the head of a user, a large, bulky, unbalanced, and/or heavy display device with heavy electro-optical modules and heavy battery would be cumbersome and uncomfortable for the user to wear. Consequently, head-mounted display devices can benefit from a compact and efficient configuration enabling FOV expansion up to natural FOV limits.

BRIEF DESCRIPTION OF THE DRAWINGS

Exemplary embodiments will now be described m conjunction with the drawings, in which:

FIG. IA is a side cross-sectional view of a near-eye display (NED) with a lightguide assembly including a beam redirector of this disclosure;

Figure 1A:
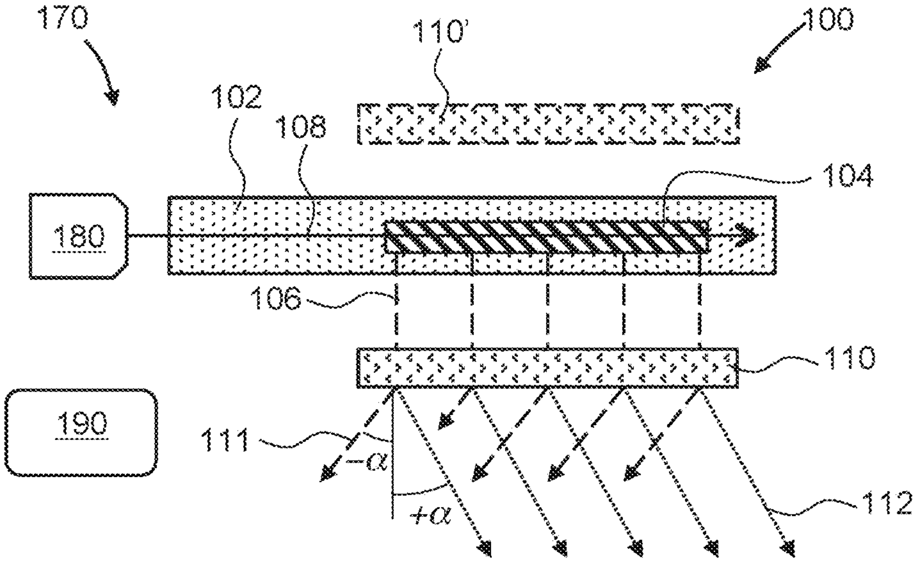
Figure 1B:
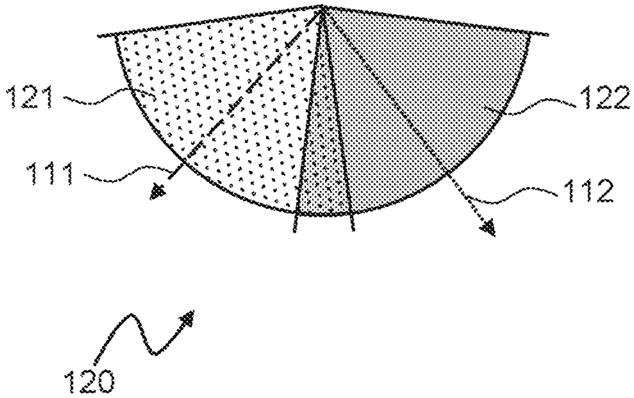
Figure 2A:
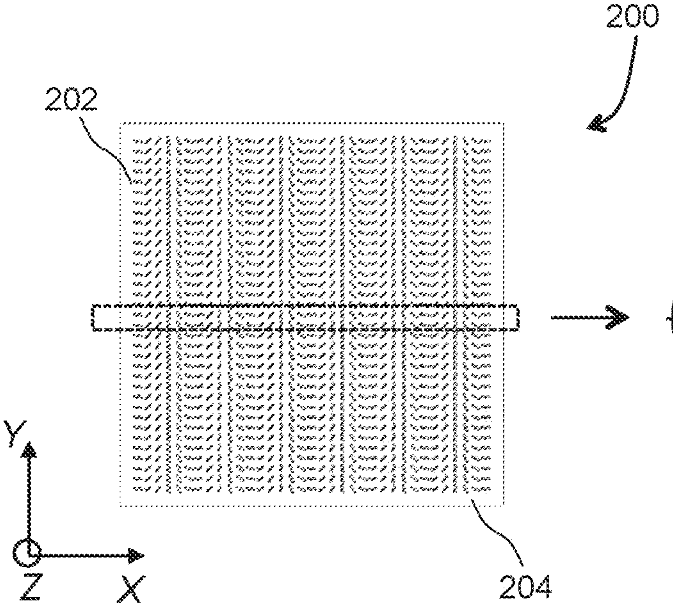
Figure 2B:
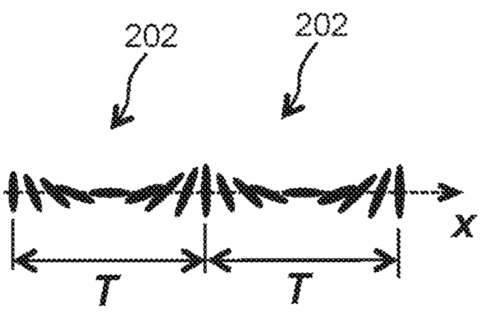
Figure 3A:
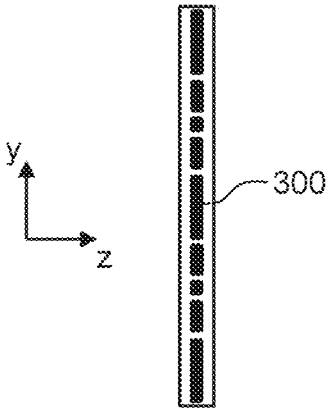
Figure 3B:
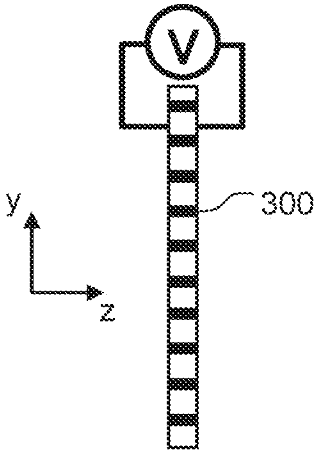
Figure 4A:
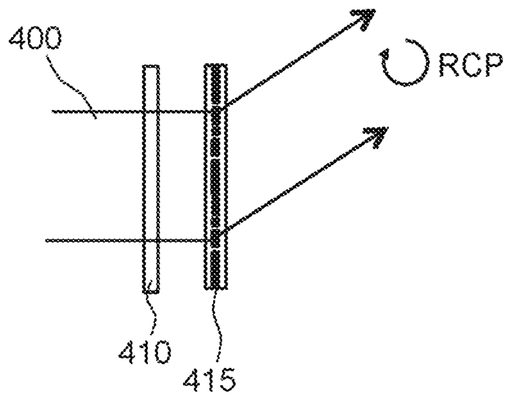
Figure 4B:
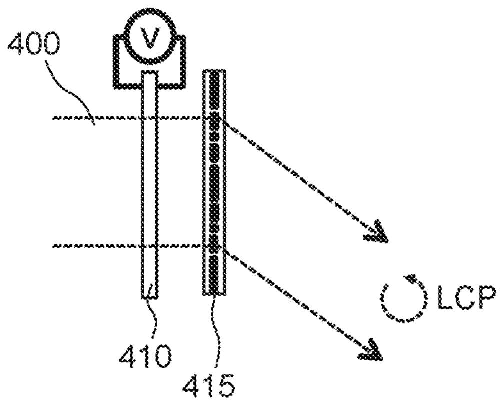
Figure 4C:
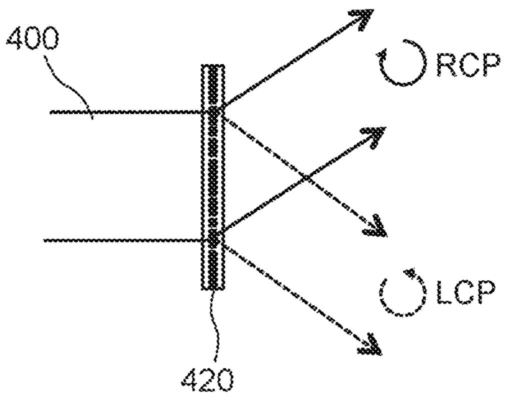
Figure 4D:
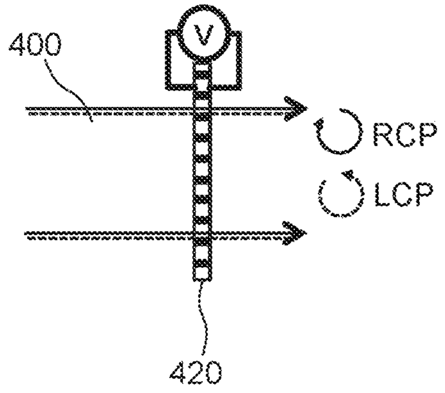
Figure 5:
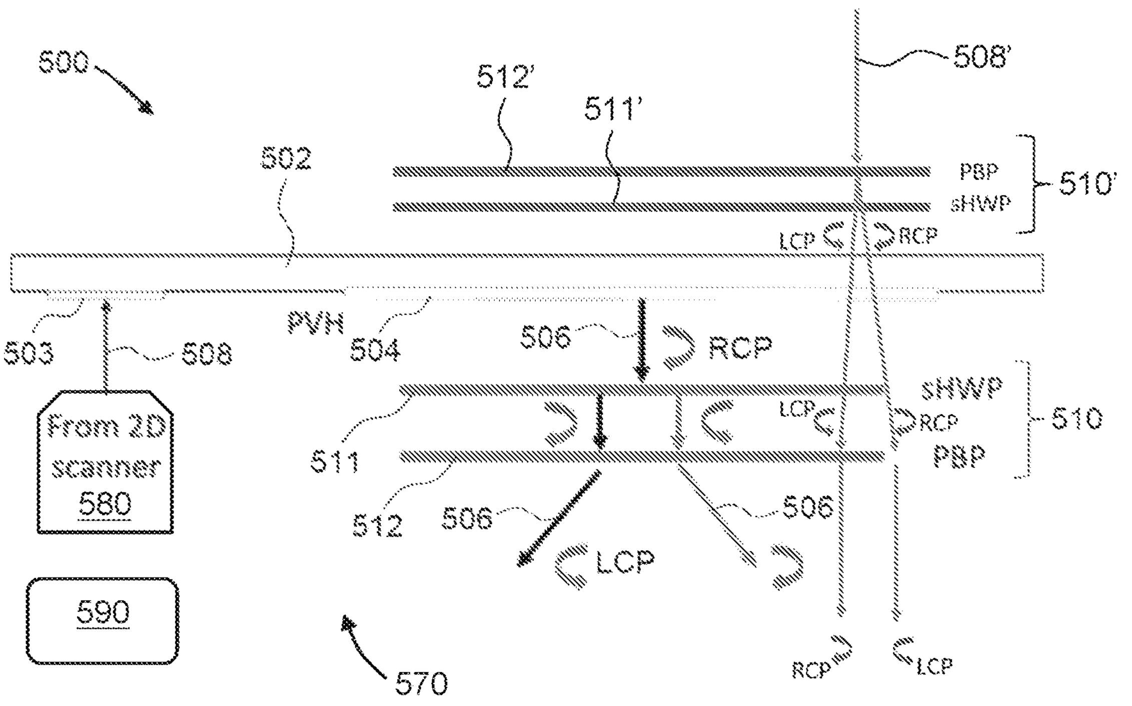
Figure 6:
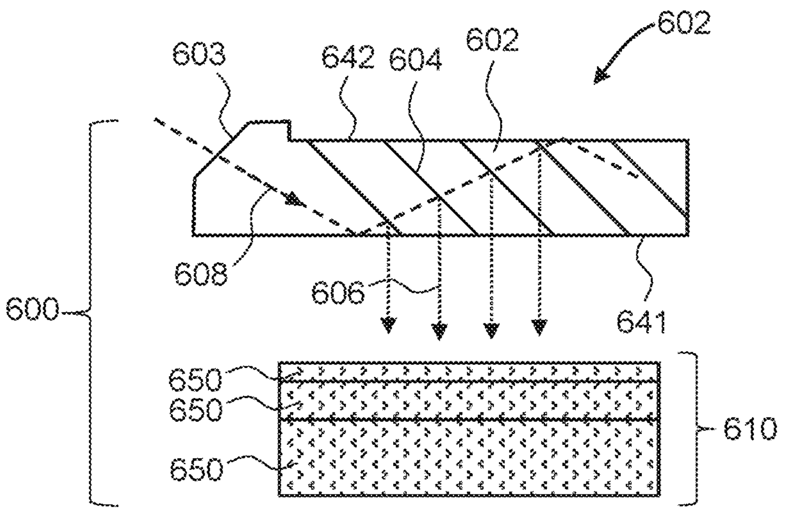
Figure 7A:
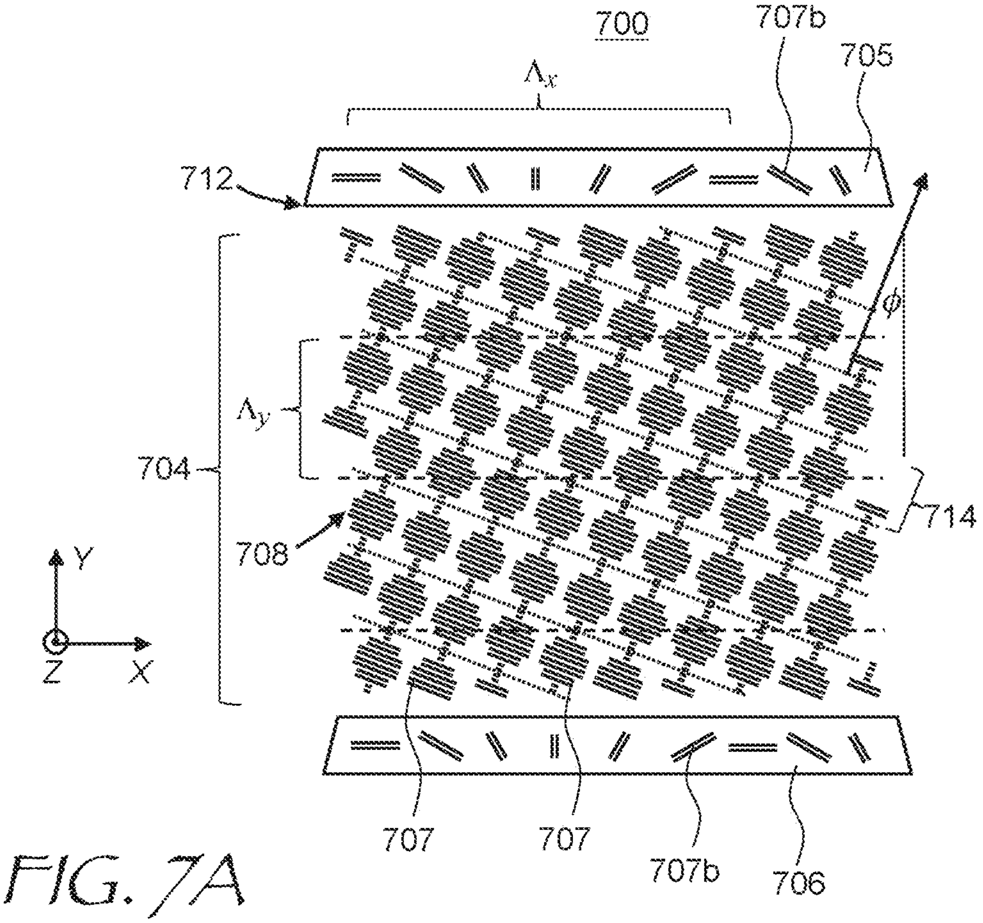
Figure 7B:
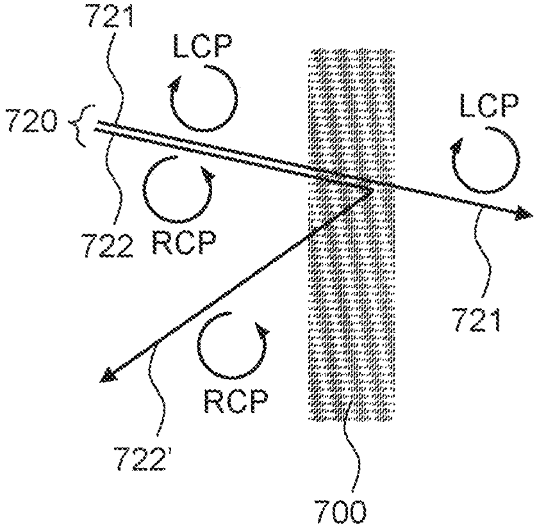
Figure 8:
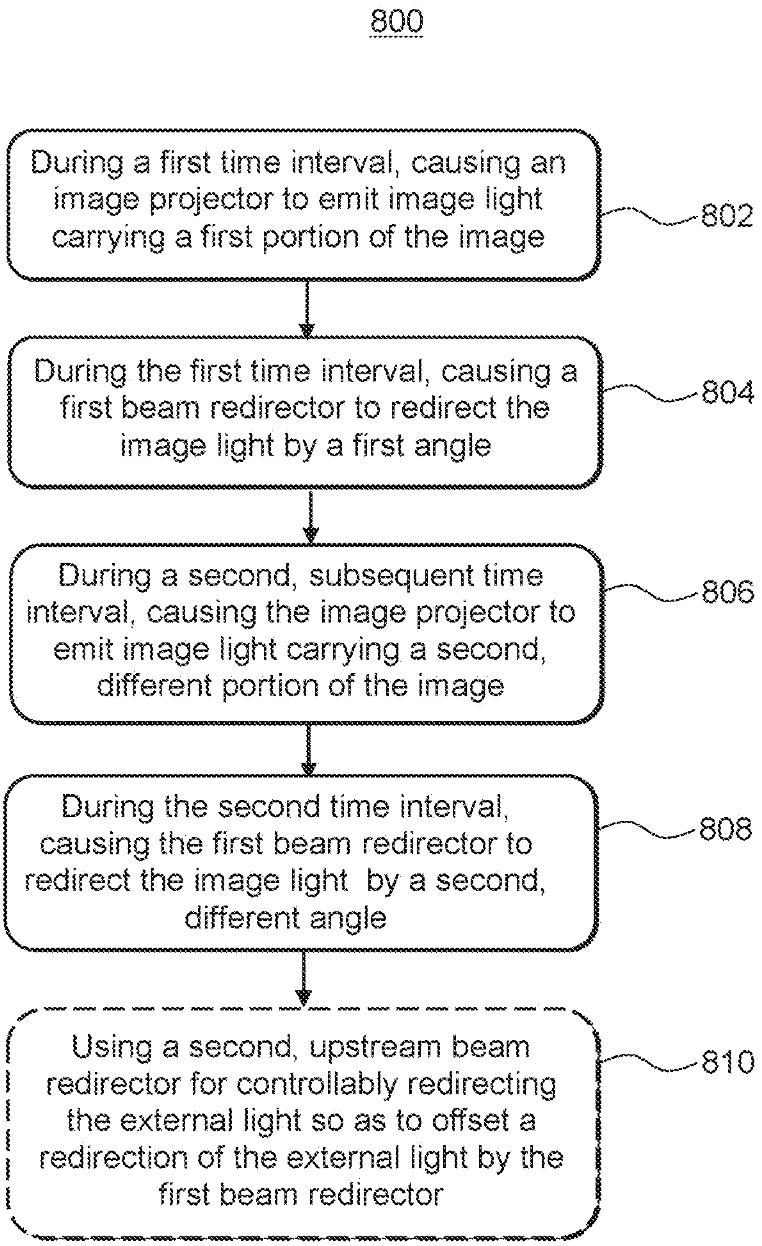
Figure 9:
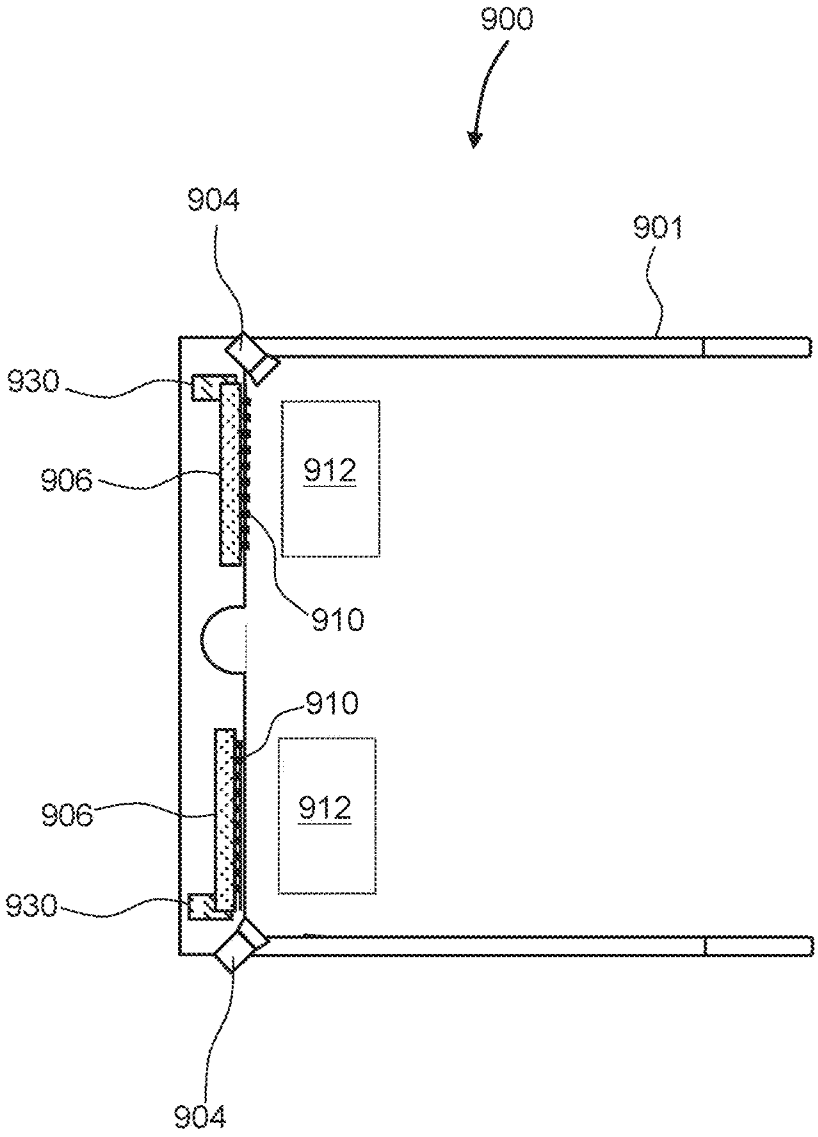

FIG. IB is a field of view (FOV) diagram illustrating the principle of FOV expansion by utilizing the beam redirector of FIG. IA;

FIG. 2A is a frontal view of a Pancharatnam-Berry phase (PBP) liquid crystal (LC) grating usable in the beam redirector of FIG. IA;

FIG. 2B is a magnified schematic view of LC molecules in an LC layer of the PBP LC grating of FIG. 2A;

FIG. 3A is an active embodiment of the PBP LC grating of FIGS. 2A, 2B in OFF state;

FIG. 3B is the active PBP LC grating in ON state;

FIGS. 4A and 4B are side cross-sectional views illustrating the operation of a beam redirector module including a switchable waveplate and a passive PBP LC grating;

FIGS. 4C and 4D are side cross-sectional views illustrating the operation of a beam redirector module including an active PBP LC grating;

FIG. 5 is a side cross-sectional view of a polarization volume hologram (PVH)/PBP embodiment of the lightguide assembly of FIG. IA;

FIG. 6 is a side cross-sectional view of a geometrical waveguide with a beam redirector module including a binary stack of switchable PBP gratings;

FIG. 7A is a side cross-sectional view of a PVH usable in a lightguide of this disclosure;

FIG. 7B is a diagram illustrating optical performance of the PVH of FIG. 7A;

FIG. 8 is a flow chart of a method of this disclosure for displaying an image to a user;

FIG. 9 is a view of wearable display of this disclosure having a form factor of a pair of eyeglasses; and FIG. IO is a three-dimensional view of a head-mounted display (HMD) of this disclosure.

DETAILED DESCRIPTION

While the present teachings are described in conjunction with vanous embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, 1.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIG. IA, FIG. 5, and FIG. 6, similar reference numerals denote similar elements.

In accordance with this disclosure, a field of view (FOV) of a near-eye display using a pupil-replicating lightguide may be expanded by providing a beam redirector downstream of the lightguide for controllably redirecting image light out-coupled by the lightguide. Such a configuration allows different FOV portions to be displayed at different moments of time, expanding the overall FOV by time sequencing through different FOV portions.

In accordance with the present disclosure, there is provided a lightguide assembly for a near-eye display. The lightguide assembly comprises a lightguide body for receiving and propagating image light carrying an image in angular domain to be displayed by the near-eye display, and a beam redirector downstream of the lightguide body. The lightguide body includes an out-coupling structure for out-coupling spaced apart portions of the image light. The beam redirector is configured for switchably redirecting the image light portions out-coupled by the out-coupling structure.

In embodiments where the beam redirector comprises a Pancharatnam-Berry phase (PBP) grating, the latter may be a passive PBP grating, or an active PBP grating comprising a liquid crystal (LC) layer switchable by application of electric field to the LC layer. The beam redirector may further include a switchable polarization rotator upstream of the PBP grating for switching polarization of the image light portions between two mutually orthogonal polarization states. The switchable polarization rotator may include a switchable waveplate, which may be based on liquid crystals. In some embodiments, the out-coupling grating may include an out-coupling grating, e.g. a polarization volume hologram (PVH) grating, and/or a plurality of slanted partial bulk reflectors.

In accordance with the present disclosure, there is provided a near-eye display (NED) comprising an image projector for providing first and second portions of an image in angular domain to be displayed by the near-eye display, and a lightguide assembly described above. The NED may further include a controller operably coupled to the image projector and the beam redirector. The controller may be configured to operate as follows. During a first time interval, the controller may cause the image projector to display the first portion of the image in angular domain, and cause the first beam redirector to redirect the image light portions by a first angle. During a second, subsequent time interval, the controller may cause the image projector to display the second portion of the image in angular domain, and cause the first beam redirector to redirect the image light portions by a second, different angle.

In embodiments where the first image portion corresponds to a first field of view (FOV) portion of the image, and the second image portion corresponds to a second, adjacent FOV portion of the image, a difference between the first and second angles of the first beam redirector may be such that the first and second FOV portions partially overlap with one another. In some embodiments, the NED may further include an additional beam redirector in a path of external light upstream of the lightguide assembly, for controllably redirecting the external light to offset a redirection of the external light by the first beam redirector.

The controller may be configured to do the following. During a first time interval, the controller may cause the image projector to display the first portion of the image in angular domain and cause the first beam redirector to redirect the image light portions by a first angle. During a second, subsequent time interval, the controller may cause the image projector to display the second portion of the image in angular domain and cause the first beam redirector to redirect the image light portions by a second, different angle. The controller may be configured to cause the additional (i.e. the second) beam redirector offset the redirection of the external light by the first beam redirector during both the first and the second time intervals.

In accordance with the present disclosure, there is further provided a method for displaying an image to a user. The method comprises the following: during a first time interval, causing an image projector to emit image light carrying a first portion of the image, and causing a first beam redirector to redirect the image light by a first angle; and during a second, subsequent time interval, causing the image projector to emit image light carrying a second, different portion of the image, and causing the first beam redirector to redirect the image light by a second, different angle. The first image portion may correspond to a first field of view (FOV) portion of the image, and the second image portion may correspond to a second, adjacent FOV portion of the image. A difference between the first and second angles of the first beam redirector may be selected such that the first and second FOV portions partially overlap with one another. The method may further include using a second beam redirector upstream in a path of external light w.r.t. the first beam redirector for controllably redirecting the external light to offset a redirection of the external light by the first beam redirector, thereby avoiding splitting of the outside imagery observed through the near-eye display (NED).

Referring now to FIG. IA, an NED 170 includes a lightguide assembly 100 optically coupled to an image projector 180. The lightguide assembly 100 includes a lightguide body I02, e.g. a slab or a plate of transparent material including glass, plastic, metal oxide, inorganic crystal, etc. The lightguide body I02 may be configured to receive image light 108 from the image projector 180. The image light 108 carries an image m angular domain, i.e. an image where individual pixels are represented by corresponding ray angles, in contradistinction e.g. to an image in linear domain where individual pixels (i.e. elements of the image being displayed) are represented by corresponding ray coordinates.

The image light 108 is shown propagating in a straight line for simplicity and generality. In some implementations, the lightguide body 102 may propagate the image light 108 by a series of zigzag reflections from its outer surfaces. The lightguide body 102 has an out-coupling structure 104 for out-coupling spaced apart portions 106 of image light 108 propagating within the lightguide body 102. The portions 106 carry an image in angular domain.

A beam redirector 110 is disposed downstream of the lightguide body 102. The beam redirector 110 switchably redirects the image light portions 106, i.e. deflects all the image light portions 106 by one of a set of pre-defined switchable angles. By having the image projector 180 display different FOV portions in a time-sequential manner, the overall FOV of an image conveyed by the image light 108 propagating in the lightguide assembly 100 may be considerably expanded.

For example, during a first time interval, the image light 108 may carry a first FOV portion, or in other words a first portion of the image in angular domain, and the beam redirector 110 may redirect the image light portions 106 by an angle –a, as illustrated with dashed lines 111. During a second, subsequent time interval, the image light 108 may carry a second FOV portion, e.g. an adjacent FOV portion, and the beam redirector 110 may redirect the image light portions 106 by an angle +a, as illustrated with dotted lines 112. In this manner, the overall FOV may be expanded by the angle of 2a. The required coordination of operation of the image projector 180 and the beam redirector 110 may be provided by a controller 190 operably coupled to both and configured to perform the above steps during the first and second time intervals.

The first and second FOV portions may have overlap between them, to avoid gaps in the overall FOV, or in other words the entire image in angular domain, carried by the image light 108. This is illustrated in FIG. IB, which shows a first FOV portion 121 partially overlapping with a second FOV portion 122, resulting in an overall FOV 120 that is almost twice larger than any of the individual first 121 or second 122 FOV portions. Such a configuration enables doubling, and more generally expanding multiple times, an overall FOV without increasing the complexity of the projector 180 and the angular bandwidth of the lightguide body I02, albeit at a cost of decreasing the overall frame rate. The image projector 180 may be based on a microdisplay, and/or a ID or 2D beam scanner scanning a collimated light beam in one or two dimensions.

For augmented reality (AR) and similar applications where the external world remains at least partially visible to the NED wearer, the lightguide assembly I00/NED 170 may further include a second, matching beam redirector 110' on the opposite side of the lightguide body 102, i.e. on the distal or "world" side of the lightguide body 102. The purpose of the matching beam redirector 110' is to compensate or offset the shift that the beam redirector 110 would otherwise impose on the outside world view, causing the outside world appearance to "double" or even split in multiple overlapping images. The controller 190 may be configured to operate both beam redirectors 110, 110'm a coordinated manner, such that one always compensates the other.

In the embodiment shown in FIG. IA, the beam redirecting module 110 may be based on one or more Pancharatnam-Berry phase (PBP) grating(s), e.g. a PBP liquid crystal (LC) grating(s). Turning to FIG. 2A, a PBP LC grating 200 includes LC molecules 202 in a thin LC layer 204. The LC molecules 202 are disposed in XY plane at a varying in-plane orientation, i.e. rotation about Z-axis, depending on the X coordinate. The orientation angle <fi . . . x) of the LC molecules 202 in the PBP LC grating 200 is given by $$¢(x) = JtX!T = 7t \times \sin 8I'Ao \quad (1)$$

where Tis pitch of the grating 200, and 0 is a diffraction angle given by $$8 = \sin^{.1}(Ao\ IT) \quad (2)$$

The azimuthal angle ¢ varies continuously across the surface of an LC layer 204 as illustrated in FIG. 2B, with a constant period T. The optical phase delay P in the PBP LC grating 200 of FIG. 2A is due to the PBP effect, which is expressed rather simply as P(x)=2¢(x) at an optical retardation R of the LC layer 204 of AQ/2, i.e. at the at the optical retardation R of half a wavelength. The accumulated phase delay P(r) due to the PBP effect is $$P(x) = 2¢(x) = 2n \times \sin 8/11 \cdot o \quad (3)$$

when R=Aol2.

The PBP LC grating 200 may be a passive device or an active device. The passive version of the PBP LC grating 200 may be preceded by an active waveplate or polarization rotator for switching polarization of the impinging light. In the active PBP LC device, the orientation of the LC molecules may be controlled by an electric field applied to the LC layer 204. In a normal (undriven) state, the LC molecules 202 orientation is determined by an alignment layer, which has been illuminated with polarized light, typically UV light, such that the LC molecules 202 are aligned in accordance with the polarization direction of the UV light used to cure the alignment layer. The pattern of the UV light, used to obtain the required spatial distribution of polarization, can be generated by employing optical interference, for example. In the driven state, the LC molecules 202 are oriented almost perpendicular to Z axis.

The operation of an active PBP LC device is illustrated in FIGS. 3A and 3B. Referring first to FIG. 3A, LC molecules 300 are aligned in-plane, that is in XY-plane as shown, to provide a required PBP effect such as redirecting or refocusing light. When the electric field is applied across the LC layer, the LC molecules 300 of a positive LC material will align preferably along the electric field lines, causing the molecules to orient out-of-plane or along Z-axis as shown in FIG. 3B, thereby erasing or at least considerably reducing the PBP effect. It is to be noted that a negative LC material, in which LC molecules orient preferably perpendicularly to the electric field lines, may also be used, in which case the action of the applied electric field is reversed.

Optical performance of a beam redirector based on PBP LC gratings 1s illustrated in FIGS. 4A to 4D. FIGS. 4A and 4B illustrate the operation of a beam redirector module based on a switchable half-wave plate or polarization rotator 410, e.g. an LC-based switchable half-wave plate or polarization rotator based on twisted nematic (TN) or mixed twisted nematic (MTN) LC cells having a twist angle of other than 90 degrees, and a passive PBP LC grating 415 downstream of the switchable half-wave plate

410. The switchable polarization rotator 410 switches polarization of the impinging light between two mutually orthogonal polarizations. When, for example, the switchable polarization rotator 410 is in an OFF state, a light beam 400 impinging onto the PBP LC grating 415 is right-circular polarized (RCP). The passive PBP LC grating 415 diffracts the RCP light beam 400 upwards, as illustrated. When the switchable polarization rotator 410 is in an ON state, a light beam 400 impinging onto the PBP LC grating 415 is left-circular polarized (LCP). The passive PBP LC grating 415 diffracts the RCP light beam 400 downwards. Thus, the beam redirecting module of FIG. 4A has a switchable beam redirection property, i.e. the light beam 400 may be switched between two pre-defined redirection angles.

Optical performance of a beam redirector module based on active PBP LC grating(s) is illustrated in FIGS. 4C and 4D. In FIG. 4C, an active PBP LC grating 420 is in OFF state, such that its LC molecules are disposed predominantly in-plane. When an incoming light beam 400 is left-circular polarized (LCP), the active PBP LC grating 420 redirects the light beam 400 upwards, which becomes right-circular polarized (RCP). The RCP deflected light beam 400 is shown with solid lines. When an incoming optical beam 400 is right-circular polarized (RCP), the active PBP LC grating 420 redirects the light beam 400 downwards, which becomes left-circular polarized (LCP). The LCP deflected beam 400 is shown with dashed lines. Applying a voltage to the active PBP LC grating 420 reorients the LC molecules as shown in FIG. 4D. As a result, the light beam 400 retains its original direction, whether it is LCP or RCP. Thus, the active PBP LC grating 420 has a switchable beam steering or redirection property.

In some embodiments, active PBP LC gratings may be combined with switchable waveplates and/or passive PBP LC gratings. Furthermore, PBP grating based redirectors may be assembled in binary stacks enabling several switchable beam deflection angles. By way of non-limiting examples, a stack of two PBP gratings may provide 4 switching angles, a stack of three PBP gratings may provide 8 switching angles, and so on. PVH gratings will be considered further below with reference to FIGS. 7A and 7B.

Referring now to FIG. 5, a lightguide assembly 500 is similar to the lightguide assembly 100 of FIG. IA, and includes similar elements. The lightguide assembly 500 of FIG. 5 includes a lightguide body 502 having an in-coupling grating 503 for in-coupling image light 508, e.g. a scanning light beam from a 2D beam scanner 580, into the lightguide body 502. The lightguide body 502 further includes an out-coupling grating, in this example a polarization volume hologram (PVH) grating 504, for out-coupling portions 506 of the image light 508 from the lightguide body I02. The lightguide assembly 500 and the 2D beam scanner 580 are components of a near-eye display (NED) 570. The NED 570 may further include a controller 590 that operates the beam scanners/image projectors and the beam redirector(s) to display different FOV portions in a time-sequential manner.

In operation, the PVH grating 504 out-couples only light of one handedness of polarization, in this example right-circular polarized (RCP) image light portions 506. The lightguide assembly 500 further includes a beam redirector module 510 disposed downstream of the lightguide body 502 for controllably redirecting the image light portions 506. In the embodiment shown, the beam redirector module 510 includes a switchable half-wave plate (sHWP) 511 that switches the polarization of the image light portions 506 between RCP light and an opposite polarization, left circular polarized (LCP). The beam redirector module 510 further includes a PBP grating 512 that redirects the image light portions 506 to the left for LCP light and to the right for RCP light, as illustrated, enabling the switching of FOV portions and thereby expanding the overall FOV as explained above with reference to FIGS. IA and IB. In some embodiments, the sHWP 511 may include a switchable LC cell e.g. a TN or MTN cell for switching between LCP and RCP, and a retarder stack for improving the broadband/off-axis performance of polarization switching.

For augmented reality (AR) and similar applications of the NED 570 where the external world remains at least partially visible to the user of a NED 570, the lightguide assembly 500 may include a matching beam redirector 510' on the opposite side of the lightguide body 502, i.e. on the distal or "world" side of the lightguide body 502. The purpose of the matching beam redirector 51O' is to compensate, offset, or undo the shift that the beam redirector 110 would otherwise impose on external light 508', causing the outside scenery appearance to "double". In the embodiment shown, the matching beam redirector 510' includes a matching PBP grating 512' that splits the external light into LCP and PRC light propagating at opposed angles to the impinging external light 508' direction as illustrated. The matching PBP grating 512' is followed by a matching switchable half-wave plate (sHWP) 511' that switches the polarization of the external light 508' from RCP to LCP and vice versa, in sync with the (sHWP) 511 disposed on the inner (proximal) side of the waveguide body 503. The controller 590 may be operably coupled to the 2D scanner 580 and both redirector modules 510, 510' and configured to cause the matching beam redirector 510' to offset the redirection of the external light 508' by the main beam redirector 510 at any moment of time.

Turning to FIG. 6, a lightguide assembly 600 is similar to the lightguide assembly 100 of FIG. IA, and includes similar elements. The lightguide assembly 600 of FIG. 6 includes a geometrical waveguide 602 coupled to a beam redirector module 610. The geometrical waveguide 602 has an in-coupling region 603 for in-coupling image light 608 to propagate in the geometrical waveguide 602 by a series of zigzag reflections, typically total internal reflections, from its opposed surfaces 641 and 642. The geometrical waveguide 602 further includes a plurality of parallel translucent slanted bulk reflectors 604 for out-coupling portions 606 of the image light 608 to propagate through the beam redirector module 610. In the embodiment shown, the beam redirector module 610 includes a stack of redirectors 650, each of which being capable of redirecting the image light portions 606 by one of two pre-determined angles. The angles of different redirectors 650 may be in a binary relationship to one another, e.g. the angle of each next redirector 650 may be twice the angle of previous, enabling redirection by a plurality of switchable angles. Binary redirectors may be used in any of the lightguide assemblies considered herein, not only in those including geometrical waveguides. In the most basic configuration, the beam redirector module 610 may include only one redirector switching between two pre-defined angles of deflection, which allows close to 2× FOV expansion. The parallel slanted bulk reflectors 604 may be partial bulk reflectors based e.g. on dielectric coatings.

Non-limiting examples of PVH gratings usable in lightguide assemblies of this disclosure will now be presented. Referring to FIG. 7A, a PVH grating 700 may be used as the out-coupling structure 104 of FIG. IA and the out-coupling structure 504 of FIG. 5. The PVH grating 700 of FIG. 7A includes an LC layer 704 bound by opposed top 705 and bottom 706 parallel surfaces. The LC layer 704 may include an LC fluid containing rod-like LC molecules 707 with positive dielectric anisotropy, i.e. nematic LC molecules. A chiral dopant may be added to the LC fluid, causing the LC molecules in the LC fluid to self-organize into a periodic helical configuration including helical structures 708 extending between the top 705 and bottom 706 parallel surfaces of the LC layer 704. Such a configuration of the LC molecules 707, termed herein a cholesteric configuration, includes a plurality of helical periods p, e.g. at least two, at least five, at least ten, at least twenty, or at least fifty helical periods p between the top 705 and bottom 706 parallel surfaces of the LC layer 704.

Boundary LC molecules **707*b* at the top surface 705 of the LC layer 704 may be oriented at an angle to the top surface 705. The boundary LC molecules 707*b* may have a spatially varying azimuthal angle, e.g. linearly varying along X-axis parallel to the top surface 705, as shown in FIG. 7A. To that end, an alignment layer 712 may be provided at the top surface 705 of the LC layer 704. The alignment layer 712 may be configured to provide the desired orientation pattern of the boundary LC molecules 707*b*, such as the linear dependence of the azimuthal angle on the X-coordinate. A pattern of spatially varying polarization directions of the UV light may be selected to match a desired orientation pattern of the boundary LC molecules 707*b* at the top surface 705 and/or the bottom surface 706 of the LC layer 704. When the alignment layer 712 is coated with the cholesteric LC fluid, the boundary LC molecules 707*b* are oriented along the photopolymerized chains of the alignment layer 712, thus adopting the desired surface orientation pattern. Adjacent LC molecules adopt helical patterns extending from the top 705 to the bottom 706 surfaces of the LC layer 704**, as shown.

The boundary LC molecules **707*b* define relative phases of the helical structures 708 having the helical period p. The helical structures 708 form a volume grating comprising helical fringes 714 tilted at an angle tp, as shown in FIG. 7A. The steepness of the tilt angle (jJ depends on the rate of variation of the azimuthal angle of the boundary LC molecules 707***b* at the top surface 705 and p. Thus, the tilt angle tp is determined by the surface alignment pattern of the boundary LC molecules 707*b* at the alignment layer 712. The volume grating has a period Ax along X-axis and Ay along Y-axis. In some embodiments, the periodic helical structures 708 of the LC molecules 707 may be polymer-stabilized by mixing in a stabilizing polymer into the LC fluid, and curing (polymerizing) the stabilizing polymer.

The helical nature of the fringes 714 of the volume grating makes the PVH grating 700 preferably responsive to light of polarization having one particular handedness, e.g. left- or right-circular polarization, while being substantially non-responsive to light of the opposite handedness of polarization. Thus, the helical fringes 714 make the PVH grating 700 polarization-selective, causing the PVH grating 700 to diffract light of only one handedness of circular polarization. This is illustrated in FIG. 7B, which shows a light beam 720 impinging onto the PVH grating 700. The light beam 720 includes a left circular polarized (LCP) beam component 721 and a right circular polarized (RCP) beam component 722. The LCP beam component 721 propagates through the PVH grating 700 substantially without diffraction. Herein, the term "substantially without diffraction" means that, even though an insignificant portion of the beam (the LCP beam component 721 in this case) might diffract, the portion of the diffracted light energy is so small that it does not impact the intended performance of the PVH grating 700. The RCP beam component 722 of the light beam 720 undergoes diffraction, producing a diffracted beam 722'.

The polarization selectivity of the PVH grating 700 results from the effective refractive index of the grating being dependent on the relationship between the handedness, or chirality, of the impinging light beam and the handedness, or chirality, of the grating fringes 714. Changing the handedness of the impinging light may be used to switch the performance of the PVH grating 700. The PVH grating 700 may also be made tunable by applying voltage to the LC layer 704, which distorts or erases the above-described helical structure. It is further noted that sensitivity of the PVH 700 to right circular polarized light in particular is only meant as an illustrative example. When the handedness of the helical fringes 714 is reversed, the PVH 700 may be made sensitive to left circular polarized light. Thus, the operation of the PVH 700 may be controlled by controlling the polarization state of the impinging light beam 720. Furthermore, in some embodiments the PVH 700 may be made tunable by application of electric field across the LC layer 704, which erases the periodic helical structures 708.

Turning to FIG. 8 with further reference to FIG. IA, a method 800 for displaying an image to a user includes causing an image projector, such as the image projector 180 of the NED 170 of FIG. IA, to emit (FIG. 8; 802) image light carrying a first portion of the image, and causing a first beam redirector such as the beam redirector 110 (FIG. IA) to redirect (804) the image light by a first angle, e.g. the angle −a in FIG. IA The emission 802 and redirection 804 of the image light carrying the first portion of the image is performed during a first time interval. The method 800 further includes causing the image projector to emit (806) image light carrying a second, different portion of the image, and causing the first beam redirector to redirect (808) the image light by a second, different angle, e.g. the angle +a in FIG. IA The emission 806 and redirection 808 of the image light carrying the second portion of the image is performed during a second time interval after the first time interval. The second, subsequent time interval may immediately follow the first time interval, or may be separated from the first time interval by an idle period if required. One of the first or second angles may be a zero angle.

Still referring to FIG. 8 with further reference now to FIG. IB, the first image portion may correspond to a first FOV portion of the image, e.g. the first FOV portion 121 in FIG. IB, and the second image portion may correspond to a second FOV portion of the image, e.g. the second FOV portion 122 in FIG. IB. The difference between the first and second angles of the first beam redirector may be such that the first and second FOV portions partially overlap with one another, as illustrated in, and explained with reference to, FIG. IB. Since the image being displayed to the user is in angular domain, the FOV portions 121, 122 of the overall FOV 120 are the portions of the displayed image.

In some embodiments, the method 800 may further include using a second beam redirector upstream in a path of external light w.r.t. the first beam redirector such as, for example, the matching beam redirector 110' of FIG. IA, for controllably redirecting (810) the external light so as to offset a redirection of the external light by the first beam redirector. The second beam redirector is used during both time intervals. The method 800 may be implemented in the controller 190 of the NED 170. The first angle or the second angle, but not both, may be zero. The first and second angles are different from one another.

Referring now to FIG. 9, an augmented reality (AR) NED 900 may include any of the lightguide assemblies disclosed herein for expanding FOV of artificially generated images. The AR near-eye display 900 of FIG. 9 includes a frame 901 supporting, for each eye: a light engine or image projector 930 for providing an image light beam carrying an image in angular domain, a pupil-replicating lightguide 906 including any of the lightguide assemblies disclosed herein, for providing multiple offset portions of the image light beam to spread the image in angular domain across an eyebox 912, and a plurality of eyebox illuminators 910, shown as black dots, spread around a clear aperture of the pupil-replicating lightguide 906 on a surface that faces the eyebox 912. An eye-tracking camera 904 may be provided for each eyebox 912.

The purpose of the eye-tracking cameras 904 is to determine position and/or orientation of both eyes of the user. The eyebox illuminators 910 illuminate the eyes at the corresponding eyeboxes 912, allowing the eye-tracking cameras 904 to obtain the images of the eyes, as well as to provide reference reflections i.e. glints. The glints may function as reference points in the captured eye image, facilitating the eye gazing direction determination by determining position of the eye pupil images relative to the glint positions. To avoid distracting the user with the light of the eyebox illuminators 910, the latter may be made to emit light invisible to the user. For example, infrared light may be used to illuminate the eyeboxes 912.

Figure 10:
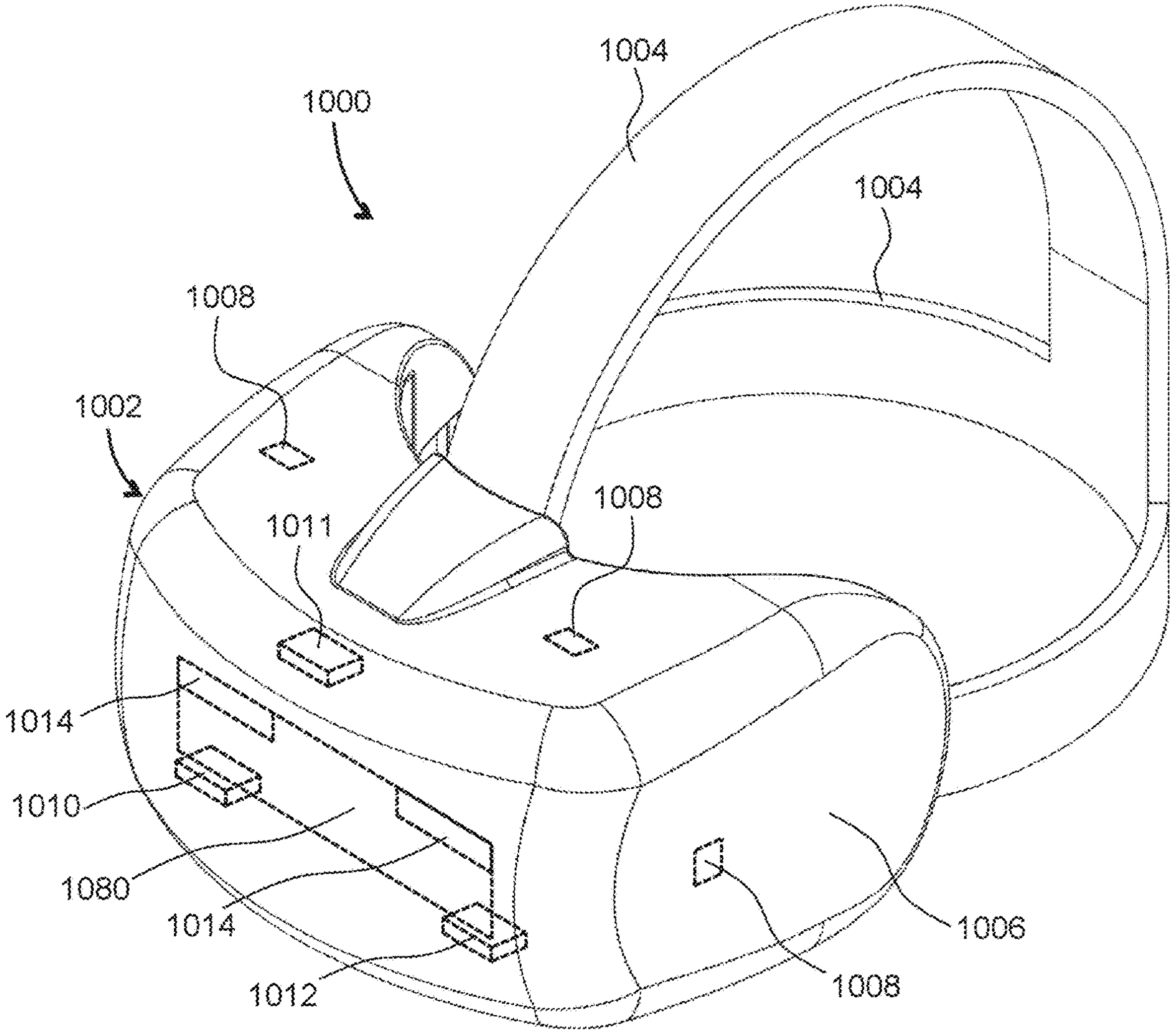

Turning to FIG. 10, an HMD 1000 is an example of an AR/VR wearable display system which encloses the user's face, for a greater degree of immersion into the AR/VR environment. The HMD 1000 may generate the entirely virtual 3D imagery. The HMD 1000 may include a front body 1002 and a band 1004 that can be secured around the user's head. The front body 1002 is configured for placement in front of eyes of a user in a reliable and comfortable manner. A display system 1080 may be disposed in the front body 1002 for presenting AR/VR imagery to the user. The display system 1080 may include any of lightguide assemblies disclosed herein. Sides 1006 of the front body 1002 may be opaque or transparent.

In some embodiments, the front body 1002 includes locators 1008 and an inertial measurement unit (IMU) 1010 for tracking acceleration of the HMD 1000, and position sensors 1012 for tracking position of the HMD 1000. The IMU 1010 is an electronic device that generates data indicating a position of the HMD 1000 based on measurement signals received from one or more of position sensors 1012, which generate one or more measurement signals in response to motion of the HMD 1000. Examples of position sensors 1012 include: one or more accelerometers, one or more gyroscopes, one or more magnetometers, another suitable type of sensor that detects motion, a type of sensor used for error correction of the IMU 1010, or some combination thereof. The position sensors 1012 may be located external to the IMU 1010, internal to the IMU 1010, or some combination thereof.

The locators 1008 are traced by an external imaging device of a virtual reality system, such that the virtual reality system can track the location and orientation of the entire HMD 1000. Information generated by the IMU 1010 and the position sensors 1012 may be compared with the position and orientation obtained by tracking the locators 1008, for improved tracking accuracy of position and orientation of the HMD 1000. Accurate position and orientation is important for presenting appropriate virtual scenery to the user as the latter moves and turns in 3D space.

The HMD 1000 may further include a depth camera assembly (DCA) 1011, which captures data describing depth information of a local area surrounding some or all of the HMD 1000. The depth information may be compared with the information from the IMU 1010, for better accuracy of determination of position and orientation of the HMD 1000 in 3D space.

The HMD 1000 may further include an eye tracking system 1014 for determining orientation and position of user's eyes in real time. The obtained position and orientation of the eyes also allows the HMD 1000 to determine the gaze direction of the user and to adjust the image generated by the display system 1080 accordingly. The determined gaze direction and vergence angle may be used to adjust the display system 1080 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1002.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system comprising:

a lightguide body for receiving and propagating image light, wherein the lightguide body includes an out-coupling structure for out-coupling the image light; and a beam redirector downstream of the lightguide body that controllably redirects the image light that was out-coupled by the out-coupling structure, wherein the image light includes field of view (FOV) light portions, wherein the beam redirector includes a switchable half-wave plate configured to, when in a first state, transmit the image light, or, when in a second state, to transmit the image light with inverted handedness, and wherein the beam redirector includes a grating that redirects the image light transmitted by the switchable half-wave plate to the left for left-circular polarized (LCP) light and to the right for right-circular polarized (RCP) light, such that the grating expands the system's field of view by allowing the FOV light portions to be switched.

2. The system of claim 1, wherein the beam redirector controllably switches polarization of the FOV light portions between RCP and LCP.

3. The system of claim 2, wherein the switchable half-wave plate further includes a switchable liquid crystal (LC) cell for switching between LCP and RCP light.

4. The system of claim 2, wherein the switchable half-wave plate further includes a retarder stack for off-axis polarization switching.

5. The system of claim 1, wherein the beam redirector comprises a Pancharatnam-Berry phase (PBP) grating.

6. The system of claim 5, wherein the PBP grating is an active PBP grating comprising an LC layer that is switchable by application of an electric field thereto.

7. The system of claim 5, wherein the beam redirector further comprises a switchable polarization rotator upstream of the PBP grating for switching polarization of the FOV light portions between two mutually orthogonal polarization states.

8. The system of claim 7, wherein the switchable polarization rotator comprises a switchable waveplate.

9. The system of claim 8, wherein the switchable waveplate comprises liquid crystals.

10. The system of claim 1, wherein the out-coupling structure comprises an out-coupling grating.

11. The system of claim 10, wherein the out-coupling grating comprises a polarization volume hologram (PVH) grating.

12. The system of claim 1, wherein the out-coupling structure comprises a plurality of slanted partial bulk reflectors.

13. A near-eye display (NED) comprising:

an image projector for providing first and second portions of an image in angular domain to be displayed by the near-eye display;

a lightguide body for receiving and propagating image light, wherein the lightguide body includes an out-coupling structure for out-coupling the image light; and a beam redirector downstream of the lightguide body that controllably redirects the image light that was out-coupled by the out-coupling structure, wherein the image light includes field of view (FOV) light portions, wherein the beam redirector includes a switchable half-wave plate configured to, when in a first state, transmit the image light, or, when in a second state, to transmit the image light with inverted handedness, and wherein the beam redirector includes a grating that redirects the image light transmitted by the switchable half-wave plate to the left for left-circular polarized (LCP) light and to the right for right-circular polarized (RCP) light, such that the grating expands the NED's field of view by allowing the FOV light portions to be switched.

14. The NED of claim 13, wherein the beam redirector controllably switches polarization of the FOV light portions between RCP and LCP.

15. The NED of claim 14, wherein the switchable half-wave plate further includes a switchable liquid crystal (LC) cell for switching between LCP and RCP light.

16. The NED of claim 14, wherein the switchable half-wave plate further includes a retarder stack for off-axis polarization switching.

17. The NED of claim 13, wherein the beam redirector comprises a Pancharatnam-Berry phase (PBP) grating, and wherein the PBP grating is an active PBP grating comprising a liquid crystal (LC) layer switchable by application of an electric field thereto.

18. The NED of claim 17, wherein the beam redirector further comprises a switchable polarization rotator upstream of the PBP grating for switching polarization of the FOV light portions between two mutually orthogonal polarization states.

19. The NED of claim 14, further comprising a second beam redirector in a path of external light upstream of the lightguide body, for controllably redirecting the external light to offset a redirection of the external light by the beam redirector.

20. A lightguide assembly comprising:

a lightguide body for receiving and propagating image light, wherein the lightguide body includes an out-coupling structure for out-coupling the image light; and a beam redirector downstream of the lightguide body that controllably redirects the image light that was out-coupled by the out-coupling structure, wherein the image light includes field of view (FOV) light portions, wherein the beam redirector includes a switchable half-wave plate configured to, when in a first state, transmit the image light, or, when in a second state, to transmit the image light with inverted handedness, and wherein the beam redirector includes a grating that redirects the image light transmitted by the switchable half-wave plate to the left for left-circular polarized (LCP) light and to the right for right-circular polarized (RCP) light, such that the grating expands the lightguide assembly's field of view by allowing the FOV light portions to be switched.

* * * * *